(12) United States Patent
Lin et al.

(10) Patent No.: US 10,015,247 B2
(45) Date of Patent: Jul. 3, 2018

(54) METHOD AND BACKGROUND SERVER FOR SYNCHRONIZING APPLICATION FOR DIFFERENT OPERATION SYSTEMS AND VERSION INFORMATION OF DIFFERENT BROWSERS

(71) Applicant: TENCENT TECHNOLOGY (SHENZHEN) COMPANY LIMITED, Shenzhen (CN)

(72) Inventors: Xiaodan Lin, Shenzhen (CN); Yu Shen, Shenzhen (CN); Pengkun Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 209 days.

(21) Appl. No.: 14/750,893

(22) Filed: Jun. 25, 2015

(65) Prior Publication Data
US 2015/0296015 A1 Oct. 15, 2015

Related U.S. Application Data (63) Continuation of application No. PCT/CN2013/090393, filed on Dec. 25, 2013.

(30) Foreign Application Priority Data

Dec. 27, 2012 (CN) .......................... 2012 1 0578997

(51) Int. Cl.
G06F 13/00 (2006.01)
H04L 29/08 (2006.01)
G06F 17/30 (2006.01)

(52) U.S. Cl.
CPC .... *H04L 67/1095* (2013.01); *G06F 17/30884* (2013.01); *H04L 67/02* (2013.01)

(58) Field of Classification Search
CPC ..... G06Q 30/02; H04L 29/06; H04L 29/0809; H04L 29/08072; H04L 29/08135;
(Continued)

(56) References Cited

U.S. PATENT DOCUMENTS

2004/0098449 A1* 5/2004 Bar-Lavi ........... H04L 29/06027
709/202
2012/0291013 A1 11/2012 Fisher

FOREIGN PATENT DOCUMENTS

CN 102131186 7/2011
CN 102291249 A 12/2011
(Continued)

OTHER PUBLICATIONS

International Search Report for International Application No. PCT/CN2013/090393, dated Mar. 27, 2014, in 2 pages.
(Continued)

*Primary Examiner* — Robert B Harrell
(74) *Attorney, Agent, or Firm* — Knobbe Martens Olson & Bear LLP (57) ABSTRACT

Provided is a method for synchronizing an application and a background server. The method includes: after a user logs on to a browser of a mobile terminal device through inputting an account and a password, receiving information of an operation system running on the mobile terminal device and version information of the browser from the mobile terminal device; obtaining a set of identifications of applications corresponding to the account; determining a URL and an icon that correspond to an identification of an application matching the information of the operation system and the version information of the browser in the set of identifications of applications; and sending the identification of the
(Continued)

matched application, and the URL and the icon that correspond to the identification of the matched application to the mobile terminal device.

10 Claims, 4 Drawing Sheets

(58) Field of Classification Search
CPC ......... H04L 29/08648; H04L 29/08981; H04L 67/02; H04L 67/1095; G06F 17/30884
USPC .................................................. 709/202, 217
See application file for complete search history.

(56) References Cited

FOREIGN PATENT DOCUMENTS

| CN | 102388632 A | 3/2012 |
|---|---|---|
| CN | 102480501 A | 5/2012 |
| CN | 102629935 | 8/2012 |
| CN | 102819461 A | 12/2012 |

OTHER PUBLICATIONS

Chinese Office Action received in Application No. CN 201210578997 dated Apr. 28, 2017, 8 pages. (Concise Explanation of Relevance for CN OA1, 1 page).
International Preliminary Report for Patentability for Application No. PCT/CN2013/090393 dated Jul. 9, 2015, 6 pages.

\* cited by examiner

METHOD AND BACKGROUND SERVER FOR SYNCHRONIZING APPLICATION FOR DIFFERENT OPERATION SYSTEMS AND VERSION INFORMATION OF DIFFERENT BROWSERS

This application is a continuation of International Application No. PCT/CN2013/090393, filed on Dec. 25, 2013. This application claims the benefit and priority of Chinese Patent Application No. 201210578997.X, filed on Dec. 27, 2012. The entire disclosures of each of the above applications are incorporated herein by reference.

TECHNICAL FIELD

The present disclosure relates to communication technologies, and more particularly to a method for synchronizing an application and a background server.

BACKGROUND

In a browser of mobile terminal device, a bookmark and a quick link may be synchronized through a logon account and a password. For example, a synchronization mechanism of bookmark and quick link based on a QQ® account is implemented as follows. The QQ® account is a cloud account. After a user logs on to a QQ® application, the browser obtains data of the bookmark and the quick link that correspond to the QQ® account from a background server. And then, the browser detects, according to a Uniform/Universal Resource Locator (URL), whether at least one piece of data of the bookmark and the quick link that is stored locally before the user logs on to the QQ® application is not included in the cloud account. If at least one piece of data is not included in the cloud account, the browser asks the user whether to import the at least one piece of data into the cloud account. If the user agrees, the at least one piece data is combined with previous data in the cloud account according to the same rule as the URL. When the QQ® application is in a logon state, an adding operation, a deleting operation and a modifying operation performed for the bookmark and the quick link at the mobile terminal device may be synchronized to cloud data in the background server. After the user cancels the QQ® account, the browser does not display the data of the bookmarks and the quick link that correspond to the QQ® account anymore, and a state before the user logs on to the QQ® application is restored.

With the development of mobile browser, requirements on the synchronization of application (for example, a web application and a plug-in application) are increased. The synchronization of application may be implemented by a mechanism similar to the synchronization mechanism of the bookmark and the quick link.

The mechanism similar to the synchronization mechanism of the bookmark and the quick link has following disadvantages.

It is impossible to issue different URLs directed to the same website for different operation systems. For example, the URL of a website "mobile phone Tencent.com" on a wap2.0 webpage is http://info.3g.qq.com/g/s?aid=index&g_f=2543, and the URL on a html5 webpage is http://info.3g.qq.com/g/s?aid=index&g_ut=3&g_f=6733. SymbianV5 operation system uses the wap2.0 webpage, and Android™ operation system or IOS® operation system uses the html5webpage.

It is impossible to issue an icon of a webpage application applicable to a current operation system for different operation systems. For example, the style of icon of an application in the Android™ operation system is different from the style of icon of the application in the IOS® operation. Further, the icon of the application in the Android™ operation system has no name, but in the IOS® operation system, the name is embedded into the icon of the application.

It is impossible to issue an application applicable to the current operation system for different operation systems. For example, the IOS® operation system has an application of "file management", but the Android™ operation system has no the application. And thus, when the application in the IOS® operation system is synchronized to the Android™ operation system, an unrecognized application may be generated in the Android™ operation system.

Accordingly, it is required to provide a method for synchronizing an application between different operation systems.

SUMMARY

Examples of the present disclosure provide a method for synchronizing an application and a background server. By the method and the background server, a URL and an icon of an application may be issued according to information of different operation systems and version information of different browsers.

The method for synchronizing an application includes:
after a user logs on to a browser of a mobile terminal device through inputting an account and a password, receiving information of an operation system running on the mobile terminal device and version information of the browser from the mobile terminal device;
obtaining a set of identifications of applications corresponding to the account;
determining a Uniform/Universal Resource Locator (URL) and an icon that correspond to an identification of an application matching the information of the operation system and the version information of the browser in the set of identifications of applications; and
sending the identification of the matched application, and the URL and the icon that correspond to the identification of the matched application to the mobile terminal device.

The background server includes:
a receiving unit, configured to, after a user logs on to a browser of a mobile terminal device through inputting an account and a password, receive information of an operation system running on the mobile terminal device and version information of the browser from the mobile terminal device;
an obtaining unit, configured to obtain a set of identifications of applications corresponding to the account after the receiving unit receives the information of the operation system and the version information of the browser;
a determining unit, configured to, after the obtaining unit obtains the set of identifications of applications, determine a Uniform/Universal Resource Locator (URL) and an icon that correspond to an identification of an application matching the information of the operation system and the version information of the browser in the set of identifications of applications; and
a sending unit, configured to send the identification of the matched application, and the URL and the icon that correspond to the identification of the matched application to the mobile terminal device.

By the method and the background server, the URL and the icon of the application may be issued according to the information of different operation systems and the version information of different browsers.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Examples of the present disclosure provide a method for synchronizing an application and a background server. By the method and the background server, a URL and an icon of an application may be issued according to information of different operation systems and version information of different browsers.

Figure 1:
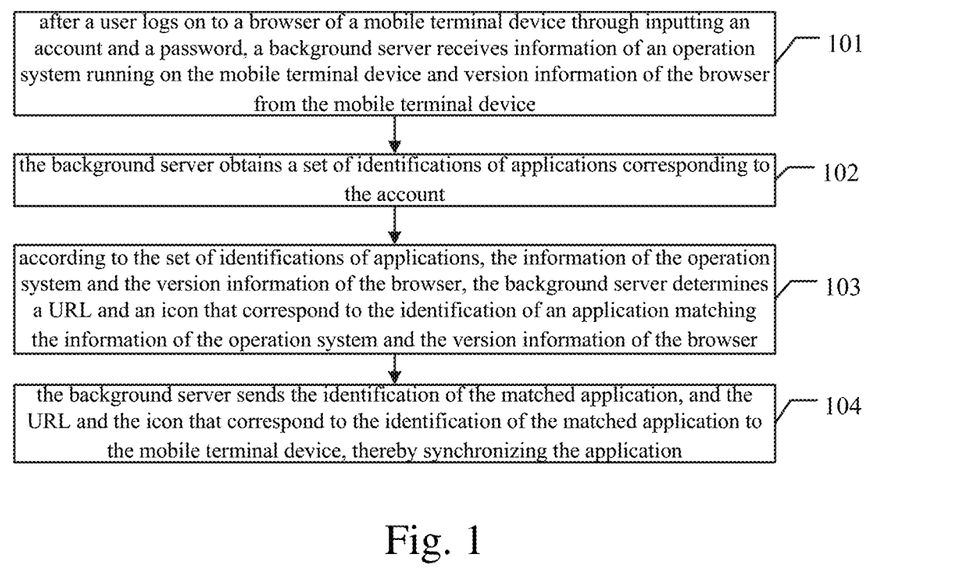
FIG. 1 is a schematic flowchart illustrating a method for synchronizing an application according to an example of the present disclosure.

FIG. 1 is a schematic flowchart illustrating a method for synchronizing an application according to an example of the present disclosure. As shown in FIG. 1, the method includes following blocks.

At block 101, after a user logs on to a browser of a mobile terminal device through inputting an account and a password, a background server receives information of an operation system running on the mobile terminal device and version information of the browser from the mobile terminal device.

In an example, the user may input the account and the password on a browser account inputting interface of the mobile terminal device. For example, the account may be a QQ® account. After the user clicks a submit command, the mobile terminal device sends the account and the password to the background server. After receiving the account and the password, the background server searches a database for the account, and determines whether a password that is stored in the database and corresponds to the account is the same as the password inputted by the user. If the password that is stored in the database and corresponds to the account is the same as the password inputted by the user, it is indicated that the user has logged on to the browser successfully. Otherwise, the background server sends a logon failure message to the mobile terminal device. And then, the mobile terminal device displays prompting information on the browser account inputting interface to prompt the user to input the account and the password again. The prompting information may be "account or password is wrong, please log on after confirmation".

In an example, after the user logs on to the browser successfully, the background server sends a logon success message to the mobile terminal device. After receiving the logon success message, the mobile terminal device sends the information of the currently run operation system and the version information of the browser to the background server.

The background server receives the information of the operation system and the version information of the browser from the mobile terminal device. The operation system may be a Symbian operation system, an Android™ operation system, and an IOS® operation system.

At block 102, the background server obtains a set of identifications of applications corresponding to the account.

In an example, after the user logs on to the browser successfully through inputting the account and the password, the mobile terminal device may add an application to the account. That is, the mobile terminal device establishes a relationship between the application and the account. After establishing the relationship between the application and the account, the mobile terminal device sends the relationship to the background server, and then the background server saves the relationship. After the user quits the browser, the mobile terminal device may delete or block applications corresponding to the account. In this way, the applications are invisible for the user and a state before the user logs on to the browser is restored, thereby protecting the privacy of the user. Further, after logging on to the browser successfully again through inputting the account and the password, the user may still obtain the applications corresponding to the account, which is convenient for the user. Each application in the mobile terminal device has a unique identification. An identification may be used to determine one application.

At block 103, according to the set of identifications of applications, the information of the operation system and the version information of the browser, the background server determines a URL and an icon that correspond to the identification of an application matching the information of the operation system and the version information of the browser.

In an example, the background server discards the identification of an application not matching the information of the operation system and the version information of the browser.

At block 104, the background server sends the identification of the matched application, and the URL and the icon that correspond to the identification of the matched application to the mobile terminal device, thereby synchronizing the application.

In this way, the URL and the icon received by the mobile terminal device may match the current operation system and the browser, thereby synchronizing the application.

By the method provided by the example of the present disclosure, the background server may send the identification and the icon of the matched application for different operation systems, and may send the URL of the matched application for the version information of different browsers in different operation systems.

Figure 2:
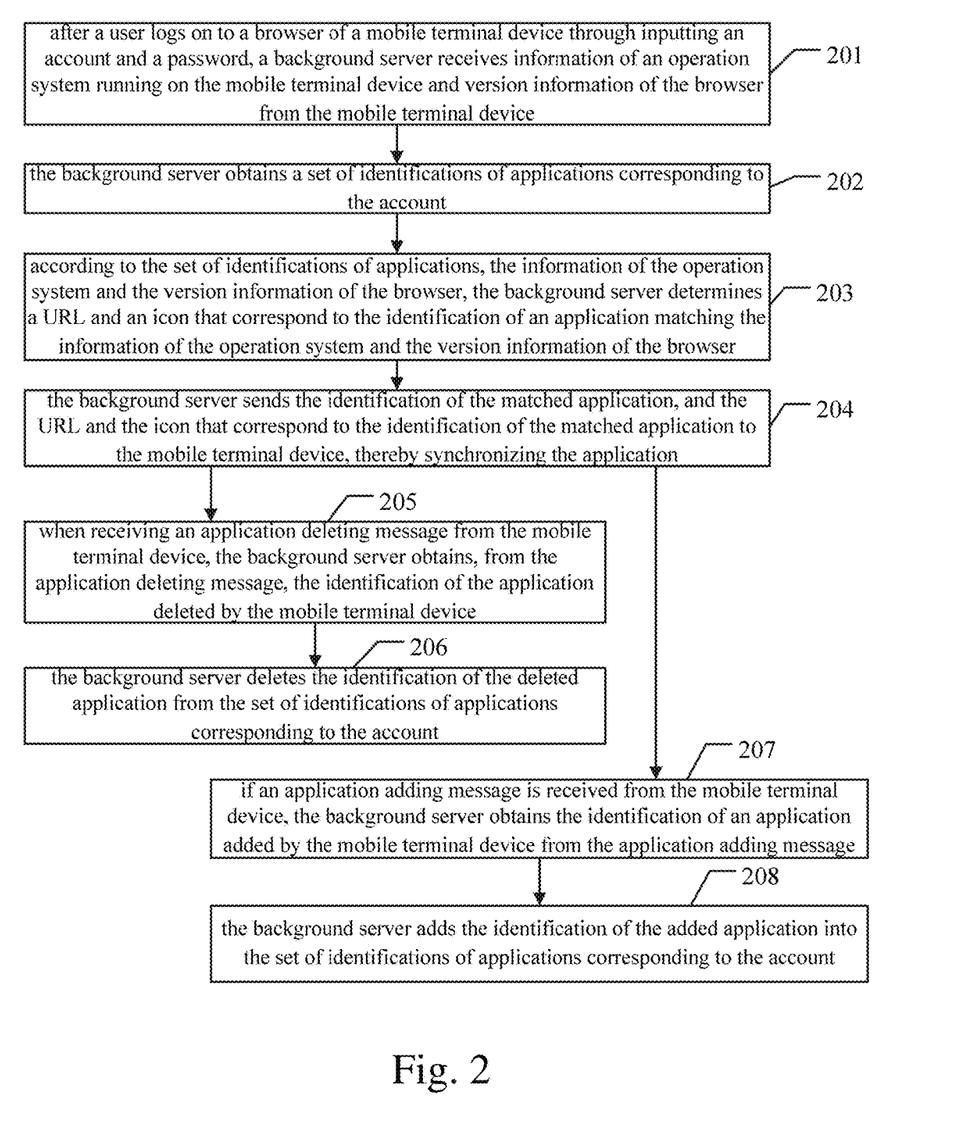
FIG. 2 is a schematic flowchart illustrating a method for synchronizing an application according to another example of the present disclosure.

FIG. 2 is a schematic flowchart illustrating a method for synchronizing an application according to another example of the present disclosure. As shown in FIG. 2, the method includes following blocks.

At block 201, after a user logs on to a browser of a mobile terminal device through inputting an account and a password, a background server receives information of an operation system running on the mobile terminal device and version information of the browser from the mobile terminal device.

At block 202, the background server obtains a set of identifications of applications corresponding to the account.

Blocks 201 and 202 are respectively similar to blocks 101 and 102.

At block 203, according to the set of identifications of applications, the information of the operation system and the version information of the browser, the background server determines a URL and an icon that correspond to the identification of an application matching the information of the operation system and the version information of the browser.

In an example, the background server discards the identification of an application not matching the information of the operation system and the version information of the browser.

The background server performs following processing for the identification of each application in the set of identifications of applications. The background server searches a data matching table, determines whether the data matching table includes an item containing a relationship between the identification of the application, the information of the operation system and the version information of the browser. In an example, the data matching table includes at least one item, and each item contains a relationship between the identification, the URL and the icon of an application, the information of the operation system and the version information of the browser. If the data matching table includes an item containing a relationship between the identification of the application, the information of the operation system and the version information of the browser, the background server may obtain the URL and the icon that correspond to the identification of the application from the item. Taking an application A for instance, if the operation system running on the mobile terminal device is Android™ operation system and the version information of the browser is Android™ QQ® browser 4.0 version, the background server determines whether the data matching table includes an item containing a relationship between the identification of the application A, the Android™ operation system and the Android™ QQ® browser version 4.0. If the data matching table includes such an item, the background server obtains the icon and the URL of the application A from the item. Accordingly, the background server may send the identification, the icon and the URL of the application A to the mobile terminal device. If the data matching table does not include such an item, the background server cannot obtain the icon of the application A in the Android™ operation system and the URL of the application A in the browser of the Android™ QQ® browser 4.0 version in the Android™ operation system. Accordingly, the background server does not send the identification of the application A to the mobile terminal device, thereby avoiding a case that the mobile terminal device cannot recognize the identification of the application A or cannot access the application A.

In the example of the present disclosure, the background server performs processing for the identification of each application in the set of identifications of applications according to the above method, thereby determining the identification of the matched application, and the icon and the URL that correspond to the identification of the matched application.

At block 204, the background server sends the identification of the matched application, and the URL and the icon that correspond to the identification of the matched application to the mobile terminal device, thereby synchronizing the application.

It should be noted that, in order to make the mobile terminal device arrange icons of applications on a displaying interface according to a predefined rule, the background server may send the number of the matched application to the mobile terminal device. Block 204 may be replaced with a process of sending to the mobile terminal device the identification of the matched application, the URL and the icon that correspond to the identification of the matched application, and the number of the matched application, so that the mobile terminal device may arrange the icon according to the number of the matched application.

In an example, in order to make the data of the mobile terminal device identical to the data of the background server, when the browser of the mobile terminal device is in a logon state, operations of adding, deleting and modifying an application on the mobile terminal device are all synchronized to the background server.

At block 205, when receiving an application deleting message from the mobile terminal device, the background server obtains, from the application deleting message, the identification of the application deleted by the mobile terminal device.

In an example, if the mobile terminal device deletes an application when the browser of the mobile terminal device is in a logon state, the mobile terminal device sends the application deleting message containing the identification of the deleted application to the background server. After receiving the application deleting message from the mobile terminal device, the background server obtains the identification of the deleted application from the application deleting message.

At block 206, the background server deletes the identification of the deleted application from the set of identifications of applications corresponding to the account.

In an example, after obtaining the identification of the deleted application, the background server deletes the identification of the deleted application from the set of identifications of applications corresponding to the account inputted by the user.

For example, if the mobile terminal device deletes an application D when the browser is in the logon state with an account C, the mobile terminal device sends the identification of the application D to the background server. And then, the background server deletes the identification of the application D from the set of identifications of applications corresponding to the account C, thereby implementing data synchronization.

At block 207, if an application adding message is received from the mobile terminal device, the background server obtains the identification of an application added by the mobile terminal device from the application adding message.

In an example, if the mobile terminal device adds the application when the browser is in the logon state, the mobile terminal device sends to the background server the application adding message containing the identification of the added application. After receiving the application adding message from the mobile terminal device, the background server obtains the identification of the added application from the application adding message.

At block 208, the background server adds the identification of the added application into the set of identifications of applications corresponding to the account.

In an example, after receiving the identification of the added application, the background server adds the identification of the added application into the set of identifications of applications corresponding to the account inputted by the user.

For example, if the mobile terminal device adds an application A when the browser is in the logon state with the account C, the mobile terminal device sends the identification of the application A to the background server. And then, the background server adds the identification of the application A into the set of identifications of applications corresponding to the account C, thereby implementing data synchronization.

In an example, after the user logs on to the browser of the mobile terminal device through inputting the account and the password, the background server determines the identification of the matched application, and the icon and the URL that correspond to the identification of the matched from the set of identifications of applications corresponding to the account according to the information of the operation system running on the mobile terminal device and the version information of the browser. Accordingly, the icon and the URL of the application may be determined according to the information of the operation system and the version information of the browser, thereby issuing the icon and the URL of the matched application according to the information of different operation systems and the version information of different browsers.

Figure 3:
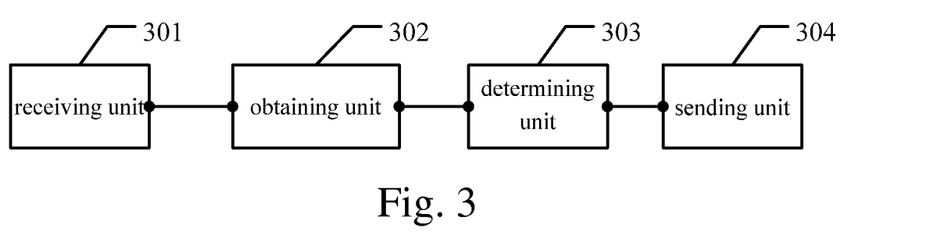
FIG. 3 is a schematic diagram illustrating the structure of a background server according to an example of the present disclosure.

FIG. 3 is a schematic diagram illustrating the structure of a background server according to an example of the present disclosure. As shown in FIG. 3, the background server includes following units.

A receiving unit 301 is configured to, after a user logs on to a browser of a mobile terminal device through inputting an account and a password, receive information of an operation system running on the mobile terminal device and version information of the browser from the mobile terminal device.

An obtaining unit 302 is configured to obtain a set of identifications of applications corresponding to the account after the receiving unit 301 receives the information of the operation system and the version information of the browser.

A determining unit 303 is configured to, after the obtaining unit 302 obtains the set of identifications of applications, determine a URL and an icon that correspond to an identification of an application matching the information of the operation system and the version information of the browser in the set of identifications of applications.

A sending unit 304 is configured to send the identification of the matched application, and the URL and the icon that correspond to the identification of the matched application to the mobile terminal device. In this way, application synchronization may be implemented.

In the example, the background server may send the identification and the icon of the matched application for different operation systems, and may send the URL of the matched application for the version information of different browsers in different operation systems.

Figure 4:
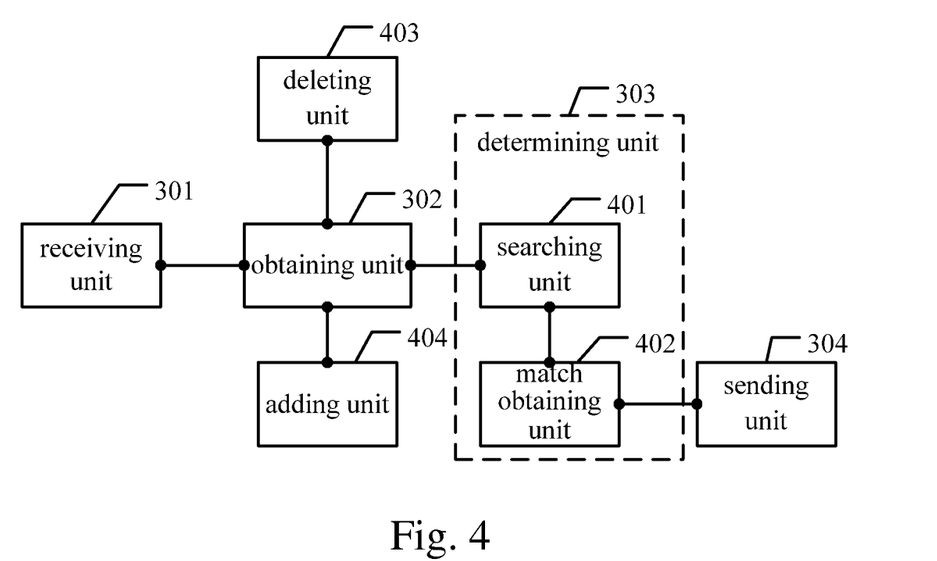
FIG. 4 is a schematic diagram illustrating the structure of a background server according to another example of the present disclosure.

FIG. 4 is a schematic diagram illustrating the structure of a background server according to another example of the present disclosure.

The receiving unit 301, the obtaining unit 302, the determining unit 303 and the sending unit 304 shown in FIG. 4 are respectively similar to the units shown in FIG. 3.

In an example, the determining unit 303 includes a searching unit 401 and a match obtaining unit 402. And, the determining unit 303 is configured to perform processing for the identification of each application in the set of identifications of applications.

The searching unit 401 is configured to search a data matching table, determine whether the data matching table includes an item containing a relationship between the identification of the application, the information of the operation system and the version information of the browser. In an example, the data matching table includes at least one item, and each item contains a relationship between the identification, the URL and the icon of an application, the information of the operation system and the version information of the browser.

The match obtaining unit 402 is configured to obtain the URL and the icon that correspond to the identification of the application from the item if the data matching table includes the item containing the relationship between the identification of the application, the information of the operation system and the version information of the browser.

In an example, the sending unit 304 is configured to send to the mobile terminal device the identification of the matched application, the URL and the icon that correspond to the identification of the matched application, and the number of the matched application, so that the mobile terminal device may arrange the icon of the matched application according to the number of the matched application.

In an example, the obtaining unit 302 is further configured to obtain, from an application deleting message, an identification of an application deleted by the mobile terminal device when the application deleting message is received from the mobile terminal device.

The background server further includes a deleting unit 403, configured to delete the identification of the deleted application from the set of identifications of applications corresponding to the account.

In an example, the obtaining unit 302 is further configured to obtain an identification of an application added by the mobile terminal device from an application adding message if the application adding message is received from the mobile terminal device.

The background server further includes an adding unit 404, configured to add the identification of the added application into the set of identifications of applications corresponding to the account.

By the background server, the URL and the icon of the application may be issued according to the information of different operation systems and the version information of different browsers.

Those skilled in the art can understand that all or part of steps in the method provided by the examples of the present disclosure may be implemented by instructing related hardware by a program, the program may be stored in a readable memory of a computer, and above method steps are included when the program is operated. The memory includes a ROM/RAM, a disk, a Compact Disc (CD) and so on.

Accordingly, an example of the present disclosure provides a non-transitory computer readable medium, which includes computer program codes for executing the processes of the method illustrated above.

Figure 5:
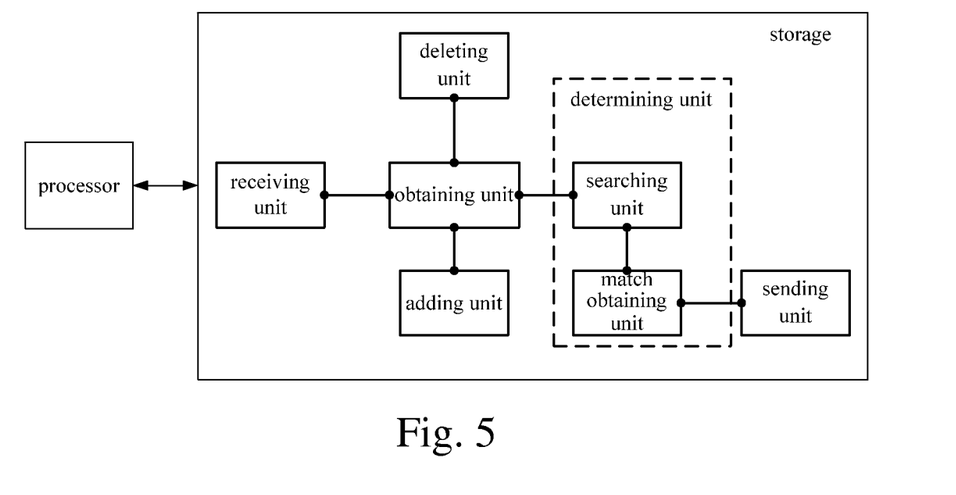
FIG. 5 is a schematic diagram illustrating the structure of a background server according to another example of the present disclosure.

FIG. 5 is a schematic diagram illustrating the structure of a background server according to another example of the present disclosure. As shown in FIG. 5, the background server at least includes a storage and a processor communicating with the storage, in which the storage includes a receiving instruction, an obtaining instruction, a determining instruction and a sending instruction that can be executed by the processor. The storage may be a non-transitory computer readable storage medium and the receiving instruction, the obtaining instruction, the determining instruction and the sending instruction may be machine readable instructions stored in the storage. The processor may also execute the machine readable instructions stored in the storage.

The receiving instruction is configured to, after a user logs on to a browser of a mobile terminal device through inputting an account and a password, receive information of an operation system running on the mobile terminal device and version information of the browser from the mobile terminal device.

The obtaining instruction is configured to obtain a set of identifications of applications corresponding to the account after the receiving instruction receives the information of the operation system and the version information of the browser.

The determining instruction is configured to, after the obtaining instruction obtains the set of identifications of applications, determine a URL and an icon that correspond to an identification of an application matching the information of the operation system and the version information of the browser in the set of identifications of applications.

The sending instruction is configured to send the identification of the matched application, and the URL and the icon that correspond to the identification of the matched application to the mobile terminal device.

In an implementation, the determining instruction includes a searching instruction and a match obtaining instruction.

For an identification of each application in the set of identifications of applications, the search instruction is configured to search a data matching table, determine whether the data matching table includes an item containing a relationship between an identification of the application, the information of the operation system and the version information of the browser, wherein the data matching table includes at least one item, and each item contains a relationship between an identification, a URL and an icon of an application, the information of the operation system and the version information of the browser.

The match obtaining instruction is configured to obtain the URL and the icon that correspond to the identification of the application from the item if the data matching table includes the item containing the relationship between the identification of the application, the information of the operation system and the version information of the browser.

In an implementation, the sending instruction is configured to send to the mobile terminal device the identification of the matched application, the URL and the icon that correspond to the identification of the matched application, and a number of the matched application, so that the mobile terminal device arranges the icon of the matched application according to the number of the matched application.

In an implementation, the obtaining instruction is further configured to obtain, from an application deleting message, an identification of an application deleted by the mobile terminal device when the application deleting message is received from the mobile terminal device.

The background server further includes a deleting instruction, configured to delete the identification of the deleted application from the set of identifications of applications corresponding to the account.

In an implementation, the obtaining instruction is further configured to obtain an identification of an application added by the mobile terminal device from an application adding message if the application adding message is received from the mobile terminal device.

The background server further includes an adding instruction, configured to add the identification of the added application into the set of identifications of applications corresponding to the account.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method, embodied on a non-transitory computer readable medium, for synchronizing an application, comprising:
    after a user logs on to a browser of a mobile terminal device through inputting an account and a password, receiving, by a background server, information of an operation system running on the mobile terminal device and version information of the browser from the mobile terminal device;
    obtaining, by the background server, a set of identifications of applications which are synchronized to the background server during a previous logon of the account to the browser;
    determining, by the background server, a Uniform/Universal Resource Locator (URL) and an icon that correspond to an identification of an application matching the information of the operation system and the version information of the browser in the set of identifications of applications; and
    sending, by the background server, the identification of the matched application, and the URL and the icon that correspond to the identification of the matched application to the mobile terminal device.

2. The method of claim 1, wherein the sending the identification of the matched application, and the URL and the icon that correspond to the identification of the matched application to the mobile terminal device comprises:
    sending the identification of the matched application, and the URL and the icon that correspond to the identification of the matched application, and a number of the matched application to the mobile terminal device, so that the mobile terminal device arranges the icon of the matched application according to the number.

3. The method of claim 2, further comprising:
    if an application deleting message is received from the mobile terminal device, obtaining, by the background server from the application deleting message, an identification of an application deleted by the mobile terminal device; and
    deleting, by the background server, the identification of the deleted application from the set of identifications of applications corresponding to the account.

4. The method of claim 2, further comprising:
if an application adding message is received from the mobile terminal device, obtaining, by the background server, an identification of an application added by the mobile terminal device from the application deleting message; and
adding, by the background server, the identification of the added application into the set of identifications of applications corresponding to the account.

5. The method of claim 1, wherein the determining the URL and the icon that correspond to the identification of the application matching the information of the operation system and the version information of the browser in the set of identifications of applications comprises:
for an identification of each application in the set of identifications of applications,
searching a data matching table, determining whether the data matching table comprises an item containing a relationship between an identification of the application, the information of the operation system and the version information of the browser, wherein the data matching table comprises at least one item, and each item contains a relationship between an identification, a URL and an icon of an application, the information of the operation system and the version information of the browser; and
if the data matching table comprises the item containing the relationship between the identification of the application, the information of the operation system and the version information of the browser, obtaining the URL and the icon that correspond to the identification of the application from the item.

6. A background server, comprising:
a receiving unit, configured to, after a user logs on to a browser of a mobile terminal device through inputting an account and a password, receive information of an operation system running on the mobile terminal device and version information of the browser from the mobile terminal device;
an obtaining unit, configured to obtain a set of identifications of applications which are synchronized to the background server during a previous logon of the account to the browser after the receiving unit receives the information of the operation system and the version information of the browser;
a determining unit, configured to, after the obtaining unit obtains the set of identifications of applications, determine a Uniform/Universal Resource Locator (URL) and an icon that correspond to an identification of an application matching the information of the operation system and the version information of the browser in the set of identifications of applications; and
a sending unit, configured to send the identification of the matched application, and the URL and the icon that correspond to the identification of the matched application to the mobile terminal device.

7. The background server of claim 6, wherein the sending unit is configured to send to the mobile terminal device the identification of the matched application, the URL and the icon that correspond to the identification of the matched application, and a number of the matched application, so that the mobile terminal device arranges the icon of the matched application according to the number of the matched application.

8. The background server of claim 7, wherein the obtaining unit is further configured to obtain, from an application deleting message, an identification of an application deleted by the mobile terminal device when the application deleting message is received from the mobile terminal device; and
the background server further comprises:
a deleting unit, configured to delete the identification of the deleted application from the set of identifications of applications corresponding to the account.

9. The background server of claim 7, wherein the obtaining unit is further configured to obtain an identification of an application added by the mobile terminal device from an application adding message if the application adding message is received from the mobile terminal device; and
the background server further comprises:
an adding unit, configured to add the identification of the added application into the set of identifications of applications corresponding to the account.

10. The background server of claim 6, wherein the determining unit comprises a searching unit and a match obtaining unit, and for an identification of each application in the set of identifications of applications,
the searching unit is configured to search a data matching table, determine whether the data matching table comprises an item containing a relationship between an identification of the application, the information of the operation system and the version information of the browser, wherein the data matching table comprises at least one item, and each item contains a relationship between an identification, a URL and an icon of an application, the information of the operation system and the version information of the browser; and
the match obtaining unit is configured to obtain the URL and the icon that correspond to the identification of the application from the item if the data matching table comprises the item containing the relationship between the identification of the application, the information of the operation system and the version information of the browser.

* * * * *